US006135475A

United States Patent [19]
Brown et al.

[11] Patent Number: 6,135,475
[45] Date of Patent: Oct. 24, 2000

[54] PORTABLE WHEELCHAIR

[76] Inventors: Richard Brown, 6206 Blossom La., Manassas, Va. 20112; Edward L. Meador, 6509 Ridgeway Dr., Springfield, Va. 22150; David E. Hume, 7225 Olde Lantern Way, Springfield, Va. 22152

[21] Appl. No.: 09/173,066

[22] Filed: Oct. 16, 1998

[51] Int. Cl.$^7$ .................................................. B62B 11/00

[52] U.S. Cl. .......................... 280/250.1; 280/39; 280/42; 280/650; 297/44; 297/DIG. 4

[58] Field of Search ............................ 280/250.1, 304.1, 280/39, 42, 650; 297/44, 42

[56] References Cited

U.S. PATENT DOCUMENTS

| | | | |
|---|---|---|---|
| 4,629,246 | 12/1986 | Fulton | 297/44 |
| 4,684,149 | 8/1987 | Meyer | 280/650 |
| 5,244,222 | 9/1993 | Benoit | 280/250.1 |
| 5,253,886 | 10/1993 | Weege | 280/39 |
| 5,577,753 | 11/1996 | Pociask | 280/250.1 |
| 5,857,688 | 7/1997 | Swearingen | 280/250.1 |

*Primary Examiner*—Christopher P. Ellis
*Assistant Examiner*—Rashmi Sharma
*Attorney, Agent, or Firm*—Aquilino, Welsh & flaxman

[57] ABSTRACT

A collapsible wheelchair is disclosed. The wheelchair includes a first wheel and a second wheel secured on opposites sides of a central support frame designed to support a seat member. The first wheel and the second wheel define a space within the circumference of each wheel. The central support frame includes a first frame member connected to the first wheel such that the first frame member may selectively move relative to the first wheel and a second frame member connected to the second wheel such that the second frame member selectively moves relative to the second wheel. A connecting member connects the first frame member to the second frame member in a manner permitting the first frame member and the second frame member to be selectively moved toward and away from each other, thereby, permitting the collapse of the wheelchair. The wheelchair further includes at least one guide wheel coupled to the central support frame for supporting the wheelchair. In use, the wheelchair is collapsed by moving the first frame member and the second frame member relative to the first wheel and the second wheel, respectively, to position the first frame member and the second frame member substantially within the space defined by the first wheel and the second wheel, and simultaneously collapsing the connecting member to permit the first frame member and the second frame member to be drawn toward each other.

15 Claims, 6 Drawing Sheets

FIG. 10
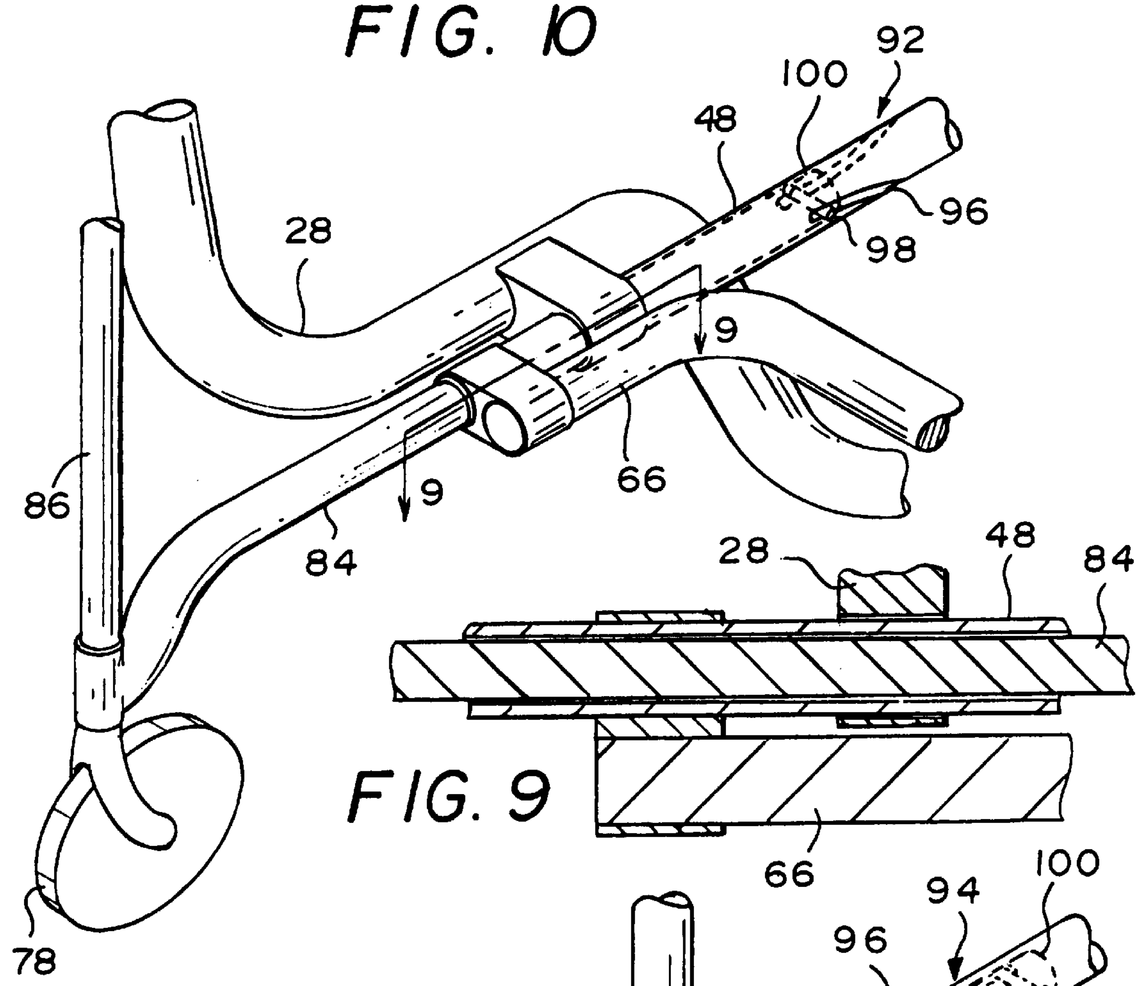
FIG. 9
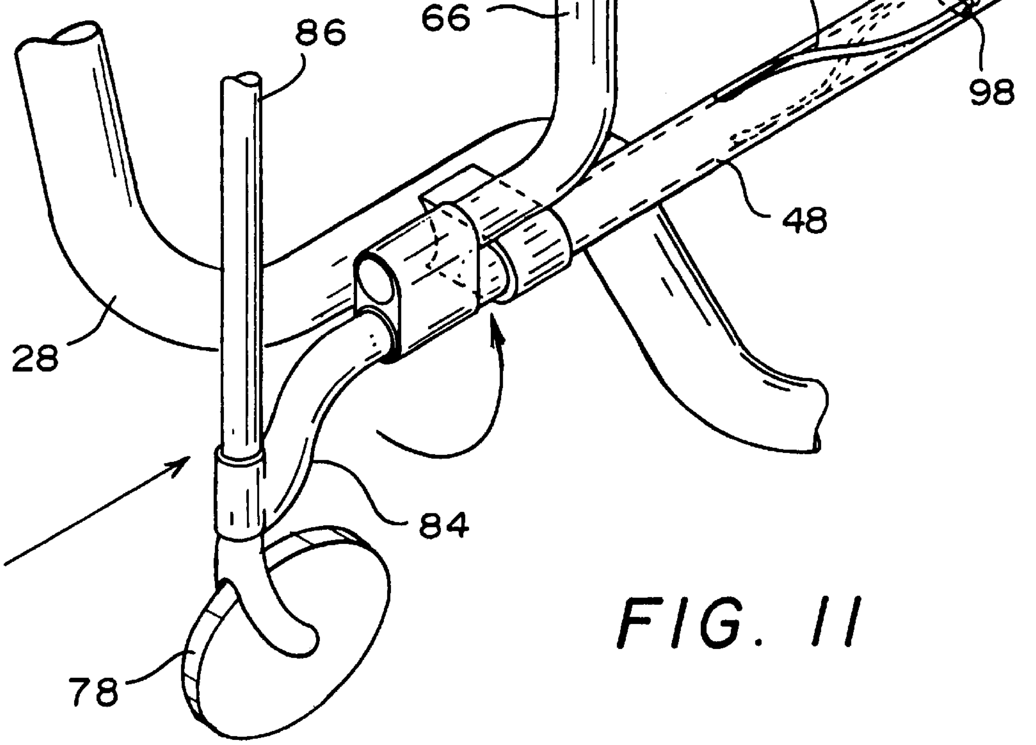
FIG. 11

PORTABLE WHEELCHAIR

BACKGROUND OF THE INVENTION

1. Field of the Invention

The invention relates to wheelchairs. More particularly, the invention relates to portable wheelchairs designed to be collapsed into a storage configuration.

2. Description of the Prior Art

Conventional wheelchairs generally include a seat, a backrest, and a footrest rigidly secured to a pair of wheels. These wheelchairs are collapsed by pushing the wheels toward each other while the seat, backrest, and footrest collapse to a certain extent. As is well known to individuals familiar with these wheelchairs, they are generally very cumbersome to transport and/or store, even when they are in their collapsed state. In addition, these wheelchairs are often very heavy and do not collapse into a convenient, compact arrangement. Specifically, conventional wheelchairs collapse such that the left and right wheels move toward each other. The collapsed wheelchair is, therefore, narrower than the fully expanded wheelchair, but the support structures associated with the wheelchair continue to extend outwardly beyond the circumference of the wheels. These extending structural elements make it difficult to store the collapsed wheelchair.

Advances in design techniques and materials have made the development of lightweight, portable wheelchairs possible. The recent development of lightweight, portable wheelchairs has been met with great anticipation by individuals confined to wheelchairs, since these individuals were previously forced to accept and deal with the functional limitations of heavier, more cumbersome wheelchairs.

Unfortunately, recent developments in lightweight wheelchairs have produced relatively complex wheelchairs. While these wheelchairs are lighter and less cumbersome than prior wheelchairs, they are often difficult for wheelchair users to operate as a result of their complex designs. For example, U.S. Pat. No. 5,261,684, to Soto, discloses a portable, lightweight wheelchair, which includes a seat and footrest secured between a pair of spokeless wheels. The wheelchair is stored by disassembling the wheels, seat and footrest. The disassembly and assembly process is, however, complicated. Furthermore, the assembly process relies upon a variety of complex connections to retain the wheelchair in its assembled configuration. Once the wheelchair is disassembled for storage, the user must handle many pieces before the wheelchair is ready to be stored away. Similarly, after retrieving the wheelchair from storage, the user must assemble the variety of pieces before the wheelchair user is ready to employ the wheelchair.

In view of the limitations of prior wheelchairs, it is apparent that a need continues to exist for a lightweight, portable wheelchair that is readily adapted for storage and/or use. Such a wheelchair should exhibit excellent stability, while permitting a wheelchair user to collapse the wheelchair with limited difficulty and subsequently prepare the wheelchair for use when the user needs the wheelchair again. The present invention provides such a wheelchair.

SUMMARY OF THE INVENTION

It is, therefore, an object of the present invention to provide a collapsible wheelchair including a first wheel and a second wheel secured on opposites sides of a central support frame designed to support a seat member. The first wheel and the second wheel define a space within the circumference of each wheel. The central support frame includes a first frame member connected to the first wheel such that the first frame member may selectively move relative to the first wheel and a second frame member connected to the second wheel such that the second frame member selectively moves relative to the second wheel. A connecting member connects the first frame member to the second frame member in a manner permitting the first frame member and the second frame member to be selectively moved toward and away from each other, thereby, permitting the collapse of the wheelchair. The wheelchair further includes at least one guide wheel coupled to the central support frame for supporting the wheelchair. In use, the wheelchair is collapsed by moving the first frame member and the second frame member relative to the first wheel and the second wheel, respectively, to position the first frame member and the second frame member substantially within the space defined by the first wheel and the second wheel, and simultaneously collapsing the connecting member to permit the first frame member and the second frame member to be drawn toward each other.

It is also an object of the present invention to provide a wheelchair wherein the connecting member folds when the wheelchair is collapsed.

It is another object of the present invention to provide a wheelchair wherein the seat member is rigid and folds when the wheelchair is collapsed.

It is a further object of the present invention to provide a wheelchair wherein the first frame member includes a cross member pivotally coupled to the first wheel and the second frame member includes a cross member pivotally coupled to the second wheel, and wherein the connecting member is coupled to the cross member of the first frame member and the cross member of the second frame member such that rotation of the cross member of the first frame member and the cross member of the second frame member causes the connecting member to fold.

It is another object of the present invention to provide a wheelchair wherein the cross member of the first frame member includes a guide slot in which a guide pin of the support arm rides when the first support arm moves within cross member of the first frame member to thereby cause the cross member of the first frame member to rotate.

It is a further object of the present invention to provide a wheelchair wherein the wheelchair includes a first guide wheel and a second guide wheel, the first guide wheel is supported by a first support arm that is telescopically received within the cross member of the first frame member such that movement of the first support arm within the cross member of the first frame member causes the cross member of the first frame member to rotate and the second guide wheel is supported by a second support arm that is telescopically received within the cross member of the second frame member such that movement of the second support arm within the cross member of the second frame member causes the cross member of the second frame member to rotate.

It is also an object of the present invention to provide a wheelchair wherein the cross member of the first frame member includes a guide slot in which a guide pin of the first support arm rides when the first support arm moves within cross member of the first frame member to thereby cause the cross member of the first frame member to rotate and the cross member of the second frame member includes a guide slot in which a guide pin of the second support arm rides when the second support arm moves within cross member of the second frame member to thereby cause the cross member of the second frame member to rotate.

It is another object of the present invention to provide a wheelchair further including a removable backrest.

It is a further object of the present invention to provide a wheelchair wherein the at least one guide wheel is removable.

It is also an object of the present invention to provide a wheelchair further including a removable footrest.

It is another object of the present invention to provide a wheelchair wherein the connecting member includes first and second pivotally coupled connectors.

It is a further object of the present invention to provide a wheelchair wherein the first and second pivotally coupled connectors fold as the central frame member is collapsed.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 9 is a cross-sectional view along the 9—9 in FIG. 10.

FIG. 10 is a detailed view of the first guide member with the wheelchair fully assembled.

FIG. 11 is a detailed view of the first guide member with the wheelchair fully collapsed.

DESCRIPTION OF THE PREFERRED EMBODIMENT

Figure 1:
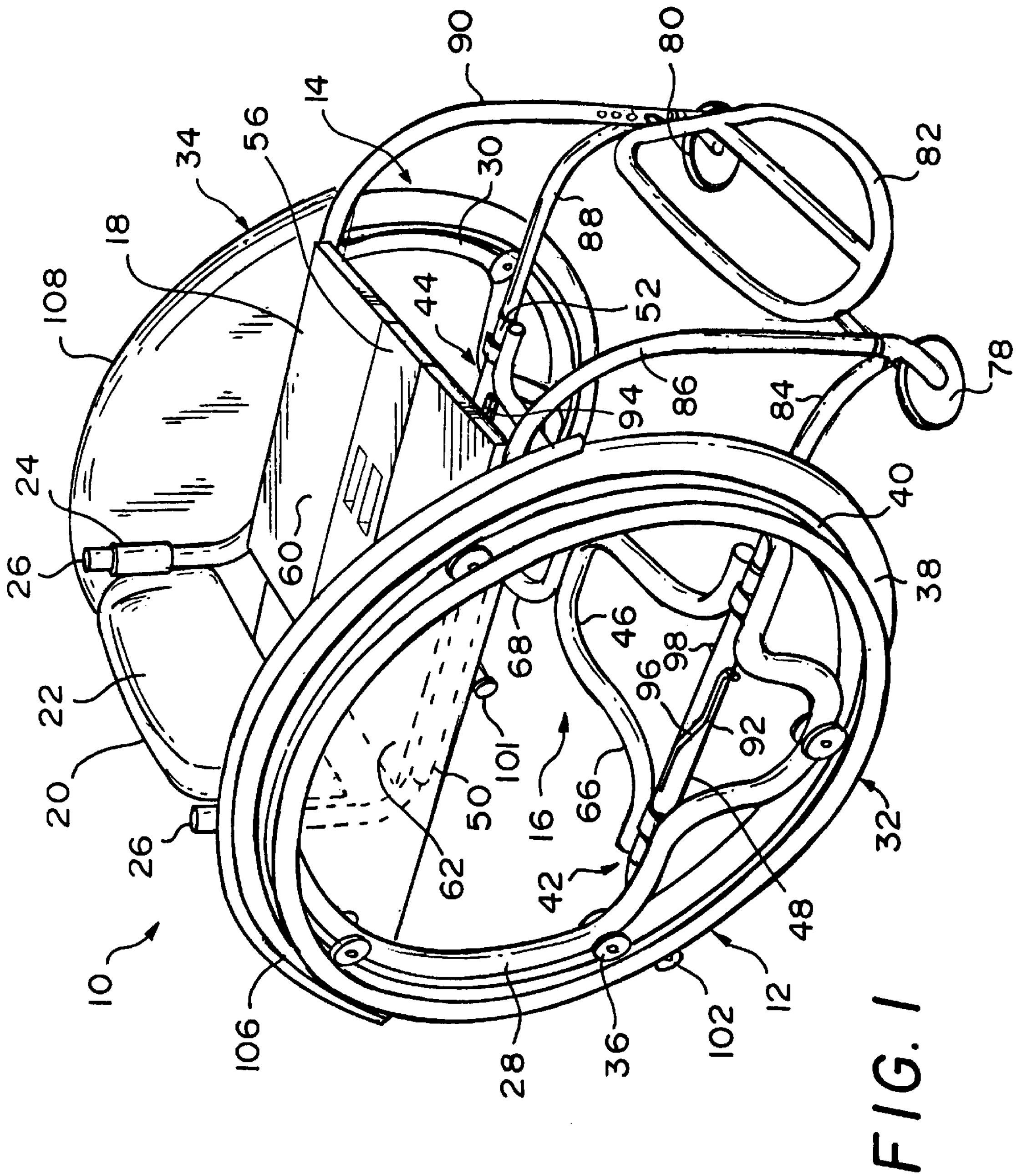
FIG. 1 is perspective view of the present wheelchair.
Figure 2:
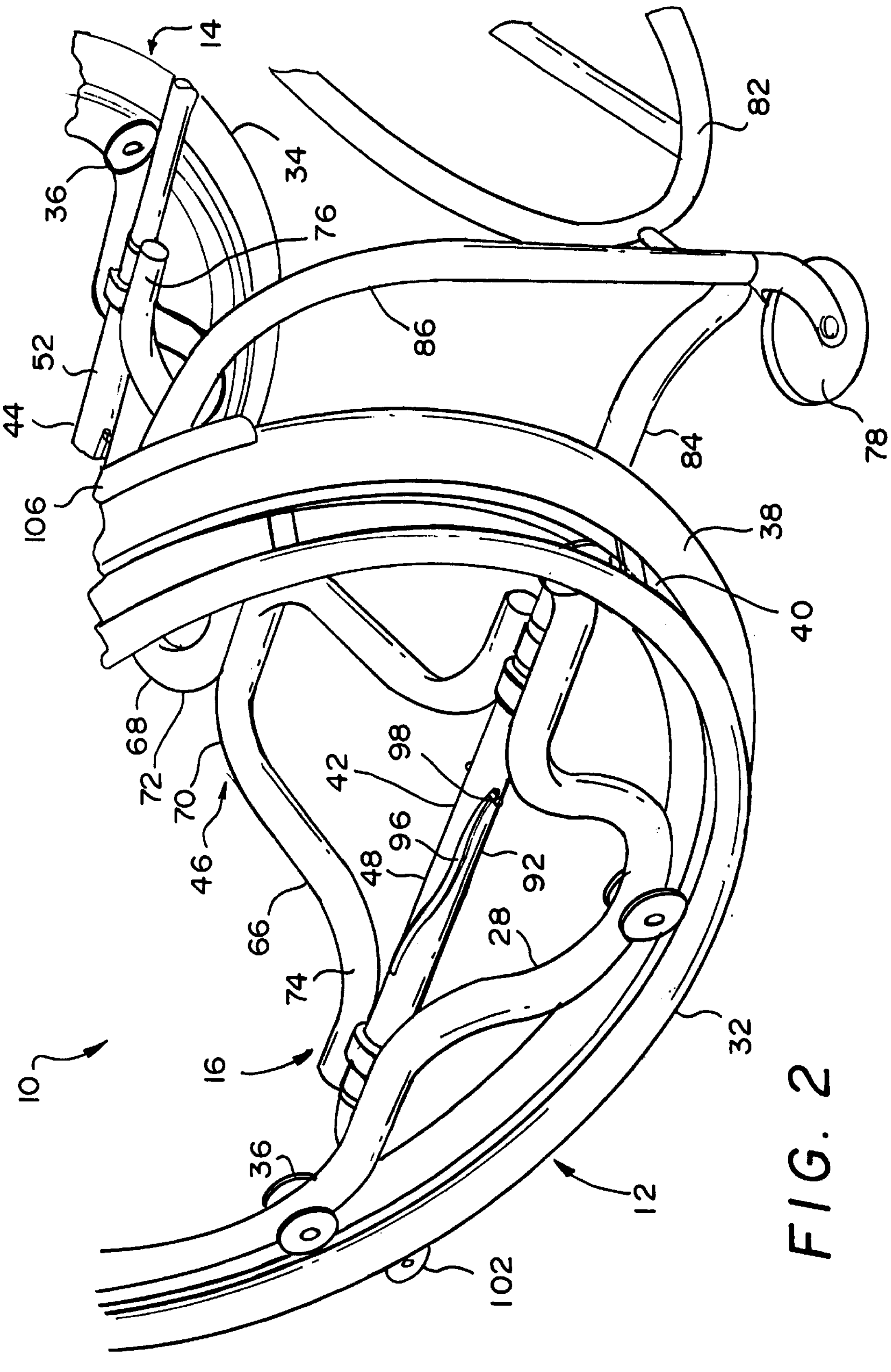
FIG. 2 is detailed view of the frame assembly in accordance with the present invention.

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

With reference to FIGS. 1–11, a portable wheelchair 10 is disclosed. The portable wheelchair 10 includes a first wheel 12 and a second wheel 14 secured on opposites sides of a central support frame 16. The central support frame 16 supports a seat member 18 and a backrest member 20 upon which a wheelchair user is supported when he or she is using the wheelchair 10. As will be discussed in greater detail below, the seat member 18 includes substantially rigid sections pivotally connected such that the seat member 18 will fold when the wheelchair 10 is selectively collapsed. Although the seat member 18 is manufactured from substantially rigid materials, the seat member 18 may be cushioned to provide a comfortable surface upon which a user may sit.

The backrest member 20 is preferably a flexible strap secured between opposite sides of the central support frame 16. The backrest member 20 includes a flexible central member 22 having loops 24 on opposite ends thereof. The loops 24 are passed over upwardly extending backrest posts 26 to releasably secure the backrest member 20 to the central support frame 16. In this way, the backrest member 20 may be selectively removed from the central support frame 16 by simply slipping the loops 24 off of the backrest posts 26. In use, the backrest member 20 is may be removed from the backrest posts 26 prior to collapsing the wheelchair 10 in the manner discussed below.

The first wheel 12 and the second wheel 14 each include a spokeless inner rim 28, 30 upon which a tire assembly 32, 34 rotates to permit movement of the wheelchair 10. The first wheel 12 will now be described in greater detail. It should be understood that the second wheel 14 is identical to the first wheel 12 with the exception that it is a mirror image of the first wheel 12.

With reference to FIGS. 1, 2, 3, 5 and 7, the first wheel 12 includes an inner rim 28 upon which a first tire assembly 32 is mounted. The inner rim 28 is constructed from aluminum or various other metals alloys or composite fiber materials. The inner rim 28 includes an outer circumference on which the first tire assembly 32 is seated. The inner rim 28 also includes a plurality of bearings 36 positioned about its outer circumference. The bearings 36 extend slightly beyond the outer circumference of the inner rim 28 and support the inner surface of the first tire assembly 32.

With this in mind, the first tire assembly 32 includes a conventional rubber tubular tire 38 adapted for inflation to facilitate a smooth and efficient ride. The tubular tire 38 is mounted on an outer rim 40. The outer rim 40 is a conventional rim. The beading of the tubular tire is mounted within the outer rim and inflated such that the tubular tire 38 is retained within the outer rim 40. The outer rim 40 includes an inner surface which rides upon the bearings 36 of the inner rim 28, while the outer surface of the tubular tire 38 is textured to ride upon the road or other support surface. The first wheel further includes a handle 41 which may be gripped by a user to move the wheelchair 10.

Although the first and second wheels 12, 14 described above are the preferred wheels for use with the present invention, it is understood that a variety of spokeless wheels are known throughout the art and could be used without departing from the spirit of the present invention.

The central support frame 16 is respectively secured to the first wheel 12 and the second wheel 14 in a manner permitting the central support frame 16 to fold substantially within the space defined by the circumference of each wheel. That is, the central support frame 16 will collapse and move relative to the wheels, permitting the central support frame 16 to fit substantially within the space defined by the circumference of each wheel.

The central support frame 16 may be constructed from a variety of materials without departing from the spirit of the present invention. The possible materials include graphite fiber reinforced thermoplastic composite, aluminum and various metal alloys.

The central support frame 16 includes a first frame member 42 connected to the first wheel 12 and a second frame member 44 connected to the second wheel 14. The first frame member 42 and the second frame member 44 are connected by a folding connecting member 46. Specifically, the first frame member 42 is composed of a first cross member 48 pivotally coupled to the first inner rim 28 along the lower half of the first wheel 12 and a second cross member 50 pivotally coupled to the first inner rim 28 along the upper half of the first wheel 12. Similarly, the second frame member 44 is composed of a first cross member 52 pivotally coupled to the second inner rim 30 along the lower half of the second wheel 14 and a second cross member 54 pivotally coupled to the second inner rim 30 along the upper half of the second wheel 14.

Figure 8:
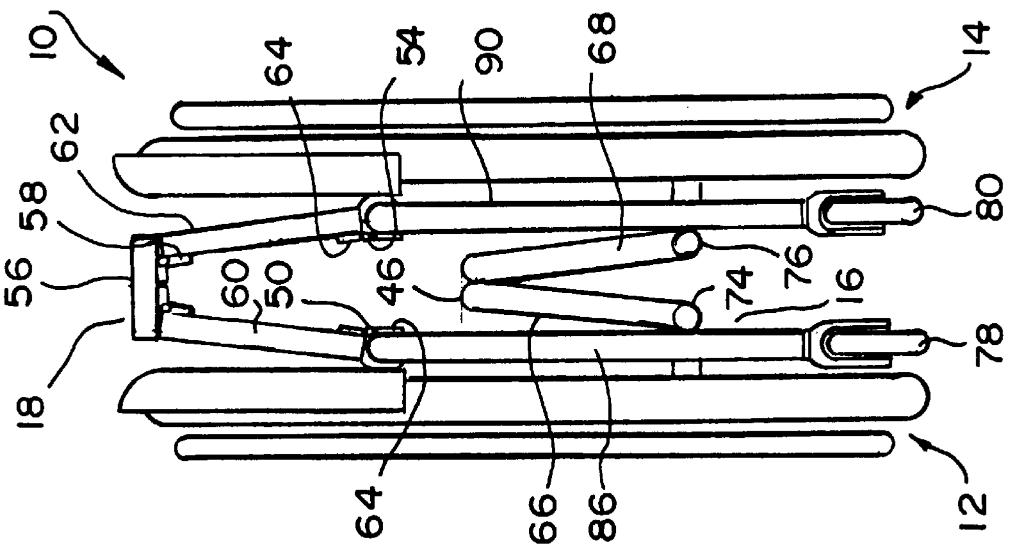
FIG. 8 is front view of a fully collapsed wheelchair in accordance with the present invention.

The second cross members 50, 54 of the first frame member 42 and the second frame member 44 form the support for the seat member 18 and the backrest member 20. The seat member 18 includes a three piece construction, which allows the seat member 18 to be folded into a compact space as shown in FIG. 8. The seat member 18 is constructed such that the central seat piece 56 includes a hinge 58 for connecting to the lateral seat pieces 60, 62, and the lateral seat pieces 60, 62 are pivotally coupled to the second cross members 50, 54 at opposites ends by hinges 64. The seat member 18 forms a portion of the support structure which connects the first and second frame members 42, 44, and ultimately, the first and second wheels 12, 14.

The first and second frame members 42, 44 are further connected by a folding connecting member 46 pivotally secured between the first and second frame members 42, 44. Specifically, the connecting member 46 is composed of first and second substantially U-shaped connectors 66, 68 which are pivotally connected at their closed ends 70, 72. The open end 74 of the first connector 66 is rigidly coupled to the first cross member 48 of the first wheel 12 such that it rotates with the first cross member 48 of the first wheel 12 and the open end 76 of the second connector 68 is rigidly coupled to the first cross member 52 of the second wheel 14 such that it rotates with the first cross member 52 of the second wheel 14. The first and second connectors 66, 68 respectively rotate with the first cross members 48, 52 in a manner that is discussed in greater detail below.

As shown in FIGS. 3 through 8, the selectively folding seat member 18 and the selectively folding connecting member 46 permit the central support frame 16 to collapse and bring the first wheel 12 and the second wheel 14 toward each other. Additional structural features of the wheelchair 10 discussed below further facilitate the collapse of the present wheelchair 10.

As with conventional wheelchairs, the present wheelchair 10 is provided with first and second guide wheels 78, 80. The first and second guide wheels 78, 80 are connected by a foot rest 82 which may be selectively removed when one desires to collapse the wheelchair 10. The first guide wheel 78 is supported by first and second support arms 84, 86 respectively extending from the first cross member 48 and the second cross member 50 of the first wheel 12. Similarly, the second guide wheel 80 is supported by first and second support arms 88, 90 respectively extending from the first cross member 52 and the second cross member 54 of the second wheel 14. The first and second support arms 84, 86, 88, 90 are respectively telescopically received within the first and second cross members 48, 50, 52, 54.

Controlled collapsing of the present wheelchair 10 is enhanced by the provision of guide members 92, 94 along the first and second frame members 42, 44 (See FIGS. 1, 2, 9, 10 and 11). Specifically, the first cross members 48, 52 of the first and second frame members 42, 44 are each provided with guide members 92, 94 to respectively control the pivoting of the first and second connectors 66, 68.

With reference to FIGS. 9, 10 and 11, the first cross member 48 of the first frame member 42 is disclosed. While only the first cross member 48 of the first frame member 42 is discussed in detail, it should be appreciated that the first cross member 52 of the second frame member 44 is a mirror image of the first frame member 42. The first cross member 48 is a cylindrical member with a central opening shaped to telescopically receive the first support arm 84 of the first guide wheel 78.

The first cross member 48 is further provided with a spiral guide slot 96 in which a guide pin 98 secured to the distal end 100 of the first support arm 84 is mounted. The guide pin 98 rides along the guide slot 96 as the first support arm 84 is telescopically moved within the first cross member 48. Since the first cross member 48 is pivotally mounted to the first wheel 12 and the first support arm 84 is mounted to prevent rotation, the first cross member 48 rotates as the guide pin 98 is moved within the guide slot 96.

As such, when the first support arm 84 is telescopically moved within the first cross member 48 to collapse the wheelchair 10, the movement of the guide pin 98 within the spiral guide slot 96 causes the first cross member 48 to rotate in a manner collapsing the wheelchair 10 (see FIG. 11). Similarly, when the first support arm 84 is telescopically withdrawn from the first cross member 48 to assemble the wheelchair 10 from its collapsed position, the movement of the guide pin 98 within the spiral guide slot 96 causes the first cross member 48 to rotate in a manner which causes the wheelchair 10 to open (see FIG. 10).

Figure 4:
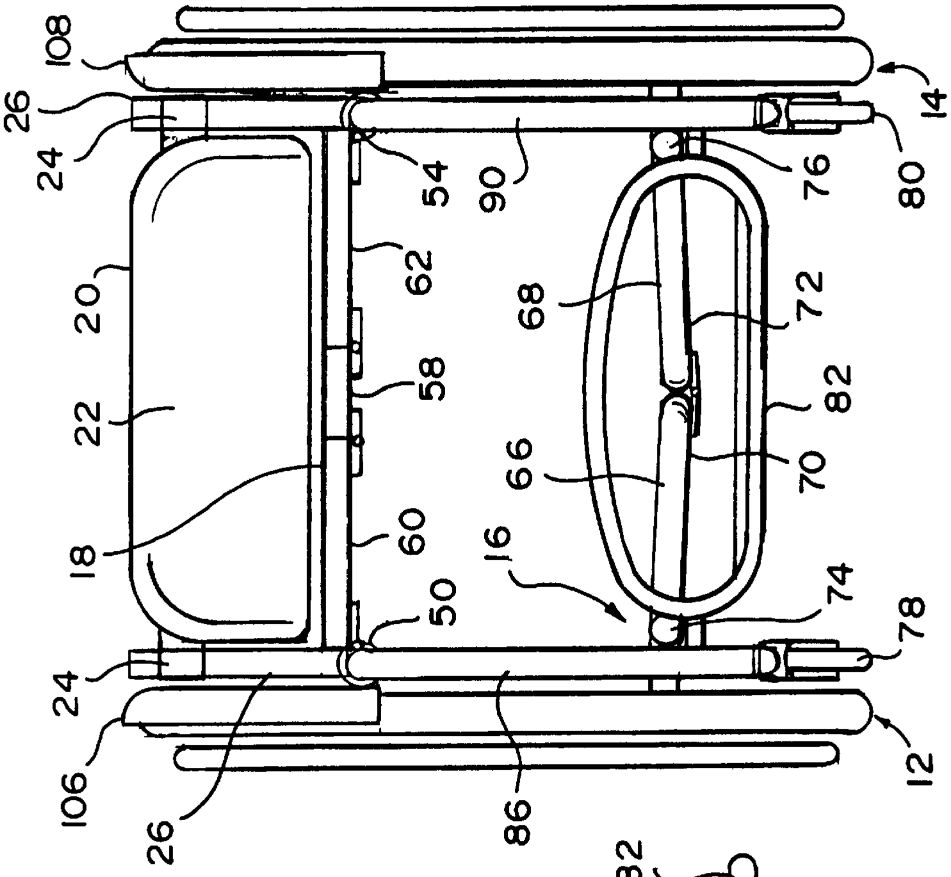
FIG. 4 is front view of a fully assembled wheelchair in accordance with the present invention.
Figure 3:
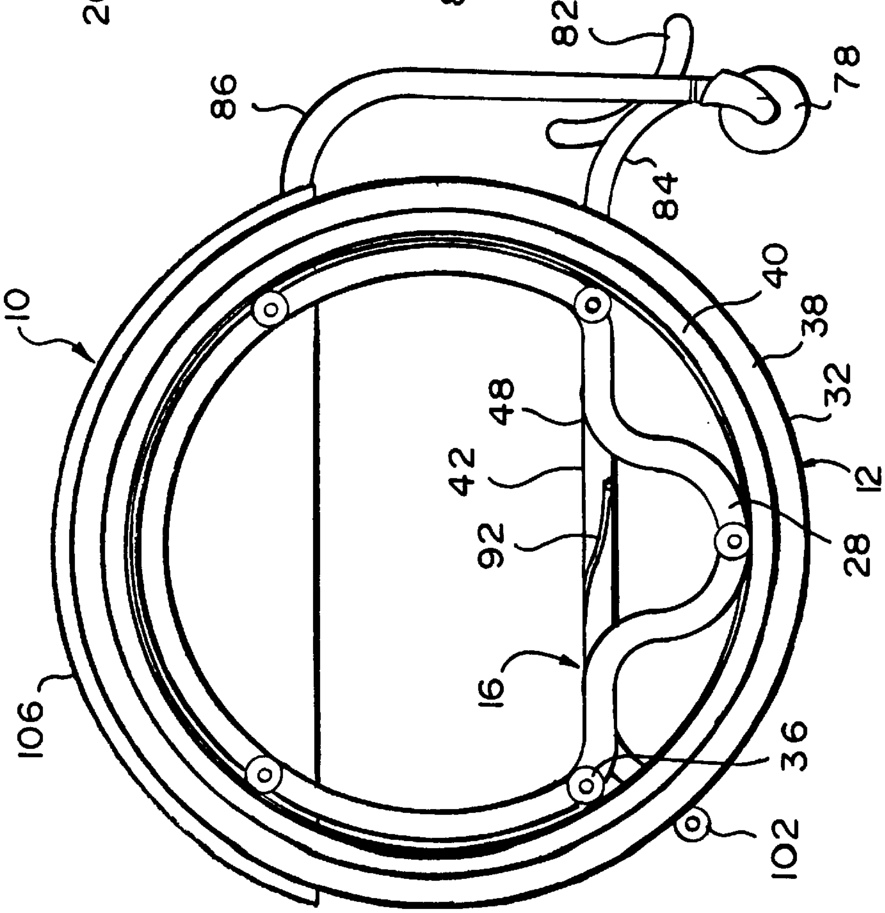
FIG. 3 is side view of a fully assembled wheelchair in accordance with the present invention.

When the wheelchair 10 is in use, the wheelchair components are fully expanded to support an individual (see FIGS. 1, 3 and 4). However, when a user determines that it is desirable to collapse the wheelchair 10 for storage, he or she simply folds the chair in the following manner. First, the footrest 82 and the backrest member 20 are removed from the wheelchair 10. The footrest 82 and backrest member 20 may be stored within the circumference of the wheels once the wheelchair 10 is fully collapsed.

The first and second support arms 84, 86, 88, 90 of the guide wheels 78, 80 are respectively moved within the cross members 48, 50, 52, 54 of the first and second wheels 12, 14. As the first support arms 84, 88 of the first and second guide wheels 78, 80 are telescopically moved within first cross members 48, 52 of the first and second frame members 42, 44, the guide pins 98, act upon the guide slots 96 to rotate the first cross members 48, 52. Rotation of the first cross members 48, 52, while the first support arms 84, 88 are telescopically moved within the first cross members 48, 52, causes the wheelchair 10 collapse.

Figure 6:
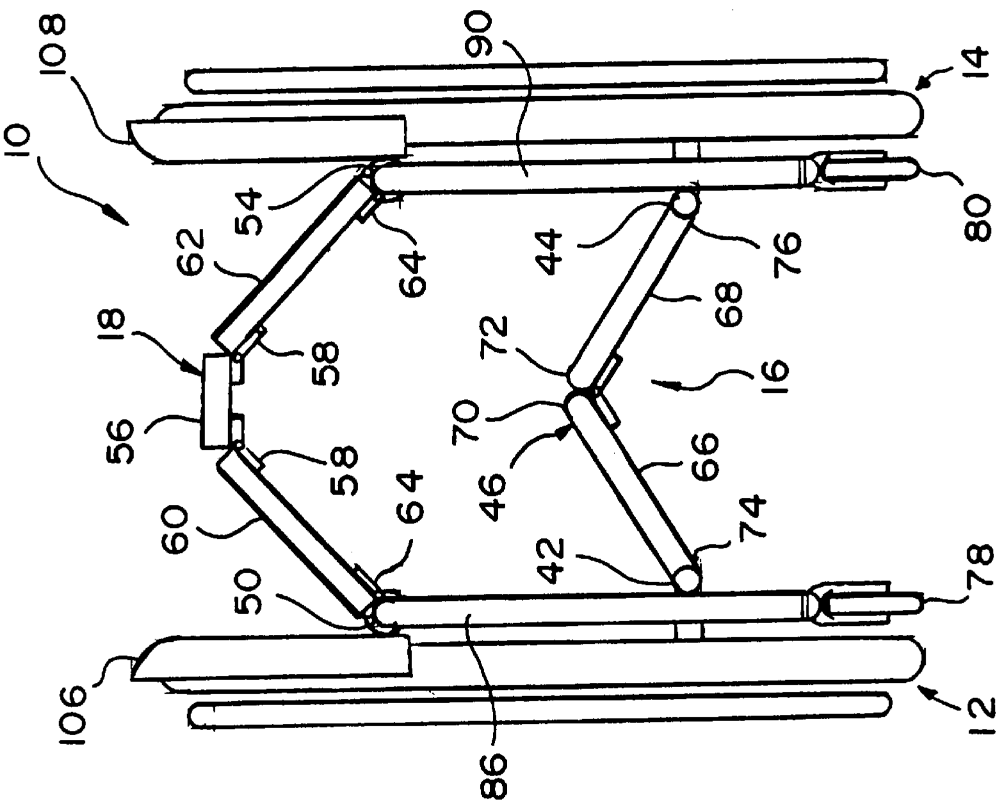
FIG. 6 is front view of a partially collapsed wheelchair in accordance with the present invention.
Figure 5:
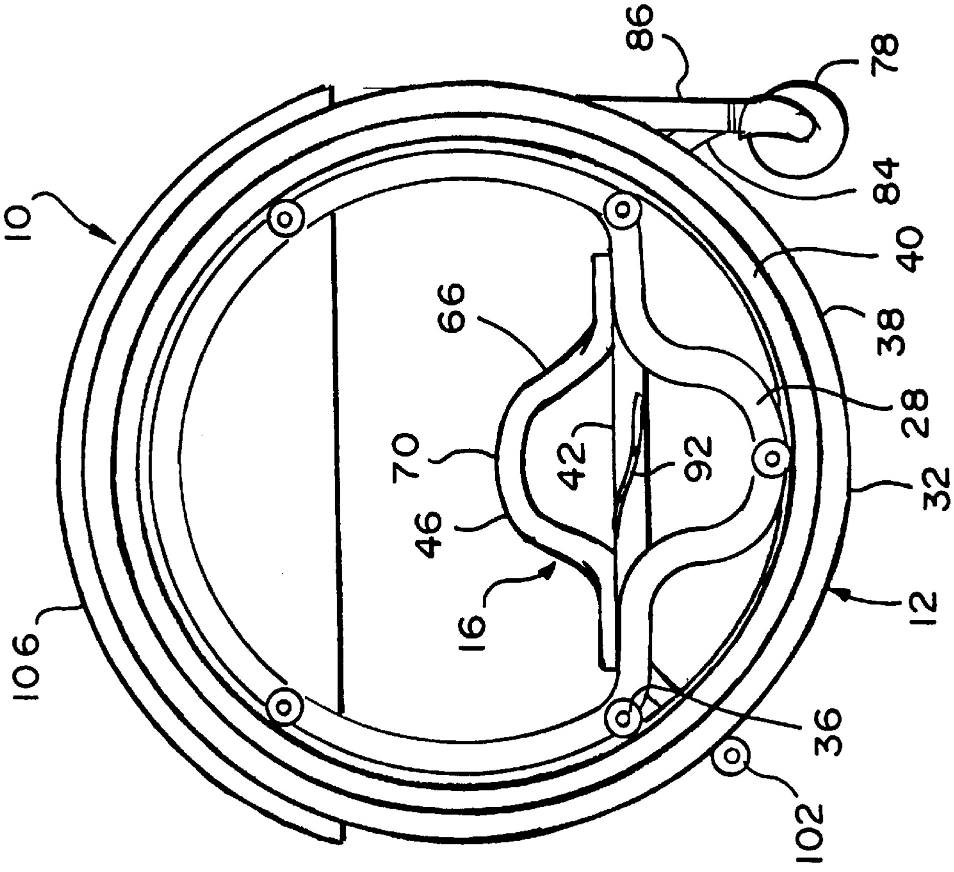
FIG. 5 is side view of a partially collapsed wheelchair in accordance with the present invention.

Specifically, as the first cross members 48, 52 of the first and second frame members 42, 44 rotate as shown in FIGS. 5 and 6, the connecting member 46 begins to fold. Folding of the connecting member 46 moves the first and second wheels 12, 14 closer, thereby collapsing the wheelchair 10. As the first and second wheels 12, 14 move closer, the seat member 18 also begins to fold.

The first support arms 84, 88 are fully moved within the first cross members 48, 52 of the first and second frame members 42, 44 and the second support arms 86, 90 are fully moved within the second cross members 50, 54 of the first and second frame members 42, 44 until the chair is fully collapsed. That is, continued movement of the first support arms 84, 88 within the first cross members 48, 52 causes continued rotation of the first cross members 48, 52 and continued folding of the connecting member 46.

Figure 7:
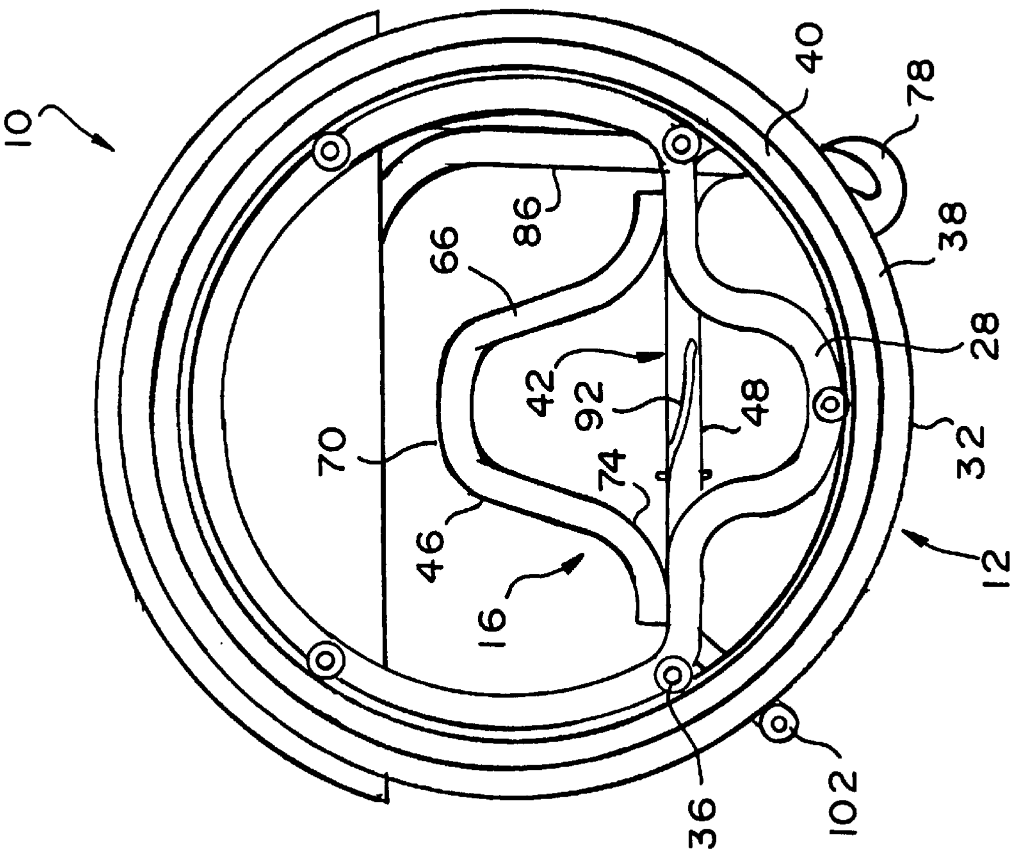
FIG. 7 is side view of a fully collapsed wheelchair in accordance with the present invention.

By the time the first support arms 84, 88 are fully moved within the first cross members 48, 52, the wheelchair 10 is fully collapsed and the components of the wheelchair 10 have substantially moved within the space defined by the circumference of the first and second wheels 12, 14 (see FIGS. 7 and 8).

Assembly of the wheelchair 10 is completed by reversing the steps used to collapse the chair. That is, as the support arms 84, 86, 88, 90 are withdrawn from the cross members 48, 50, 52, 54, the connecting member 46 begin to unfold, moving the first and second wheels 12, 14 apart. This is continued until the first support arms 84, 88 are fully withdrawn from the first cross members 48, 52. Once the wheelchair 10 is fully expanded, the backrest member 20 and the footrest 82 may be reattached.

Although a manually powered wheelchair has been disclosed, the wheelchair could be motorized without departing from the spirit of the present invention. For example, a battery/motor could be housed within the inner rim to contact the tire assembly. In addition, the grooved rails may be formed integrally, or the grooves may be formed on separated members secured to the rails during the assembly of the wheelchair.

The safety and security of the present wheelchair 10 is enhanced by the provision of support wheels 102, 104 along the back edge of the central support frame 16 and covers 106, 108 for the upper portions of the first and second wheels 12, 14. Specifically, the first and second support wheels 102, 104 are respectively attached at the ends of the first cross members 48, 52 of the first and second frame members 42, 44. These support wheels 102, 104 help to prevent the wheelchair 10 from tilting backwardly and injuring the individual using the wheelchair 10.

While various preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A collapsible wheelchair, comprising:

a first wheel and a second wheel secured on opposites sides of a central support frame designed to support a seat member, the first wheel and the second wheel defining a space within the circumference of each wheel;

the central support frame including a first frame member connected to the first wheel such that the first frame member may selectively move relative to the first wheel and a second frame member connected to the second wheel such that the second frame member selectively moves relative to the second wheel;

a connecting member connecting the first frame member to the second frame member in a manner permitting the first frame member and the second frame member to be selectively moved toward and away from each other, thereby, permitting the collapse of the wheelchair;

at least one guide wheel coupled to the central support frame for supporting the wheelchair; and wherein the wheelchair is collapsed by moving the first frame member and the second frame member relative to the first wheel and the second wheel, respectively, to position the first frame member and the second frame member substantially within the space defined by the first wheel and the second wheel, and simultaneously collapsing the connecting member to permit the first frame member and the second frame member to be drawn toward each other.

2. The wheelchair according to claim 1, wherein the connecting member folds when the wheelchair is collapsed.

3. The wheelchair according to claim 1, wherein the seat member is rigid and folds when the wheelchair is collapsed.

4. The wheelchair according to claim 1, wherein the first frame member includes a cross member pivotally coupled to the first wheel and the second frame member includes a cross member pivotally coupled to the second wheel, and wherein the connecting member is coupled to the cross member of the first frame member and the cross member of the second frame member such that rotation of the cross member of the first frame member and the cross member of the second frame member causes the connecting member to fold.

5. The wheelchair according to claim 4, wherein the at least one guide wheel is supported by a support arm, the support arm is telescopically received within the cross member of the first frame member such that movement of the support arm within the cross member of the first frame member causes the cross member of the first frame member to rotate.

6. The wheelchair according to claim 5, wherein the cross member of the first frame member includes a guide slot in which a guide pin of the support arm rides when the first support arm moves within cross member of the first frame member to thereby cause the cross member of the first frame member to rotate.

7. The wheelchair according to claim 4, wherein the wheelchair includes a first guide wheel and a second guide wheel, the first guide wheel is supported by a first support arm that is telescopically received within the cross member of the first frame member such that movement of the first support arm within the cross member of the first frame member causes the cross member of the first frame member to rotate and the second guide wheel is supported by a second support arm that is telescopically received within the cross member of the second frame member such that movement of the second support arm within the cross member of the second frame member causes the cross member of the second frame member to rotate.

8. The wheelchair according to claim 7, wherein the cross member of the first frame member includes a guide slot in which a guide pin of the first support arm rides when the first support arm moves within the cross member of the first frame member to thereby cause the cross member of the first frame member to rotate and the cross member of the second frame member includes a guide slot in which a guide pin of the second support arm rides when the second support arm moves within cross member of the second frame member to thereby cause the cross member of the second frame member to rotate.

9. The wheelchair according to claim 8, wherein the seat member is rigid and folds when the wheelchair is collapsed.

10. The wheelchair according to claim 1, further including a removable backrest.

11. The wheelchair according to claim 1, wherein the at least one guide wheel is removable.

12. The wheelchair according to claim 1, further including a removable footrest.

13. The wheelchair according to claim 1, wherein the seat member is substantially rigid and folds as the central frame member collapses.

14. The wheelchair according to claim 1, wherein the connecting member includes first and second pivotally coupled connectors.

15. The wheelchair according to claim 14, wherein the first and second pivotally coupled connectors fold as the central frame member is collapsed.

* * * * *